United States Patent
Dijkstra et al.

(10) Patent No.: US 6,436,569 B1
(45) Date of Patent: Aug. 20, 2002

(54) ELECTRICAL APPLIANCE WITH BATTERY HOLDER

(75) Inventors: Peter Dijkstra, Assen; Adam W. C. Deermann, Harkstede, both of (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/556,548

(22) Filed: Apr. 24, 2000

(30) Foreign Application Priority Data

Apr. 23, 1999 (EP) .............................. 99201288

(51) Int. Cl.⁷ .......................... H01M 2/02; H01M 2/10
(52) U.S. Cl. ............................... 429/97; 429/100
(58) Field of Search ................... 429/96–100

(56) References Cited

U.S. PATENT DOCUMENTS

| | | | | |
|---|---|---|---|---|
| 4,084,123 A | * | 4/1978 | Lineback | 320/2 |
| 4,868,074 A | * | 9/1989 | Omori | 429/98 |
| 4,871,629 A | * | 10/1989 | Bunyea | 429/97 |
| 5,552,240 A | * | 9/1996 | Derstine | 429/96 |
| 5,792,573 A | * | 8/1998 | Pitzen | 429/97 |
| 5,800,940 A | * | 9/1998 | Bunyea | 429/97 |
| 6,124,056 A | * | 9/2000 | Kimura | 429/100 |

FOREIGN PATENT DOCUMENTS

| | | | | |
|---|---|---|---|---|
| DE | 39 02 442 A | * | 8/1989 | H01M/2/10 |
| JP | 06 163016 A | * | 9/1994 | H01M/2/10 |
| JP | 07 114910 A | * | 9/1995 | H01M/2/10 |
| WO | WO00/65674 | * | 11/2000 | H01M/2/10 |

\* cited by examiner

*Primary Examiner*—Patrick Ryan
*Assistant Examiner*—Mark Ruthkosky
(74) *Attorney, Agent, or Firm*—Ernestine C. Bartlett

(57) ABSTRACT

An electrical appliance (1) has a battery holder (5) which can be inserted into a recess (4) of the appliance. The battery holder is locked in the appliance by a locking mechanism (8) which comprises resilient fingers (9, 10) arranged on the battery holder (5), which fingers are made of a plastic material and have projections (13, 14), and a boss (15) arranged in the recess (4) of the appliance, for cooperation with the projections (13, 14). Resilient metal limbs (blade springs 26, 27) support the resilient plastic fingers (9, 10) and also conduct current from the batteries (7) to the appliance.

6 Claims, 2 Drawing Sheets

ELECTRICAL APPLIANCE WITH BATTERY HOLDER

BACKGROUND OF THE INVENTION

The invention relates to an electrical appliance having a battery holder, which battery holder has a housing which can accommodate at least one battery and which battery holder can be inserted into a housing of the electrical appliance, locking means being provided for locking the battery holder in the appliance.

Such removable battery holders, also referred to as power packs, are used, for example, in electrically chargeable appliances such as drills. An example of this is described in DE-A1-39 02 442. The construction for locking such battery holders in the electrical appliance often comprises a large number of parts, which are usually made of a plastic.

SUMMARY OF THE INVENTION

It is an object of the invention to provide a removable battery holder for an electrical appliance, which holder has a comparatively small number of parts for locking the battery holder and which has a locking mechanism which is reliable, also in the long run.

To this end, the appliance in accordance with the invention is characterized in that the locking means are formed by two spaced-apart resilient plastic fingers which each have a projection and by at least one boss for cooperation with the projections of the resilient fingers which fingers and boss have been provided, respectively, on the housing of the battery holder and on the housing of the appliance or the other way around, and which resilient plastic fingers are supported, in the direction of their resilient action, by resilient limbs of a material having a stiffness greater than the stiffness of the resilient plastic fingers. The plastic fingers and the boss can simply be molded integrally with the housing of the battery holder and with the housing of the appliance, respectively. When the battery holder is fitted into the appliance the boss slides between the resilient fingers, upon which the projections are moved apart and subsequently come together after passage of the boss. The resilient limbs whose stiffness is greater than that of the fingers back up the resilient action of the plastic fingers, as a result of which a reliable operation and locking of the battery holder is achieved. To remove the battery holder from the appliance no release button as in DE-A1-39 02 442 is needed. Moving plastic parts are frequently subject to creep. Creep gives rise to a reduction of the force with which the battery holder is locked in the appliance. The resilient limbs prevent the locking mechanism from being adversely affected by creep. The resilient limbs form an additional part but they prolong the life of the mechanism significantly. Moreover, the resilient limbs have an additional advantage, as will be explained hereinafter.

Preferably, the material of the resilient limbs is an electrically conductive metal.

A preferred embodiment is characterized in that the housing on which the boss has been provided has electrically conductive limbs which upon insertion of the battery holder into the electrical appliance automatically make contact with the resilient metal limbs which serve for supporting the resilient plastic fingers. The metal limbs make electrical contact with the terminals of the battery (batteries). In their turn, the electrically conductive limbs are connected to a part to be energized of the electrical appliance.

BRIEF DESCRIPTION OF THE DRAWINGS

The invention will now be described in more detail with reference to an example shown in drawings. In the drawings.

DESCRIPTION OF THE PREFERRED EMBODIMENTS

Figure 1:
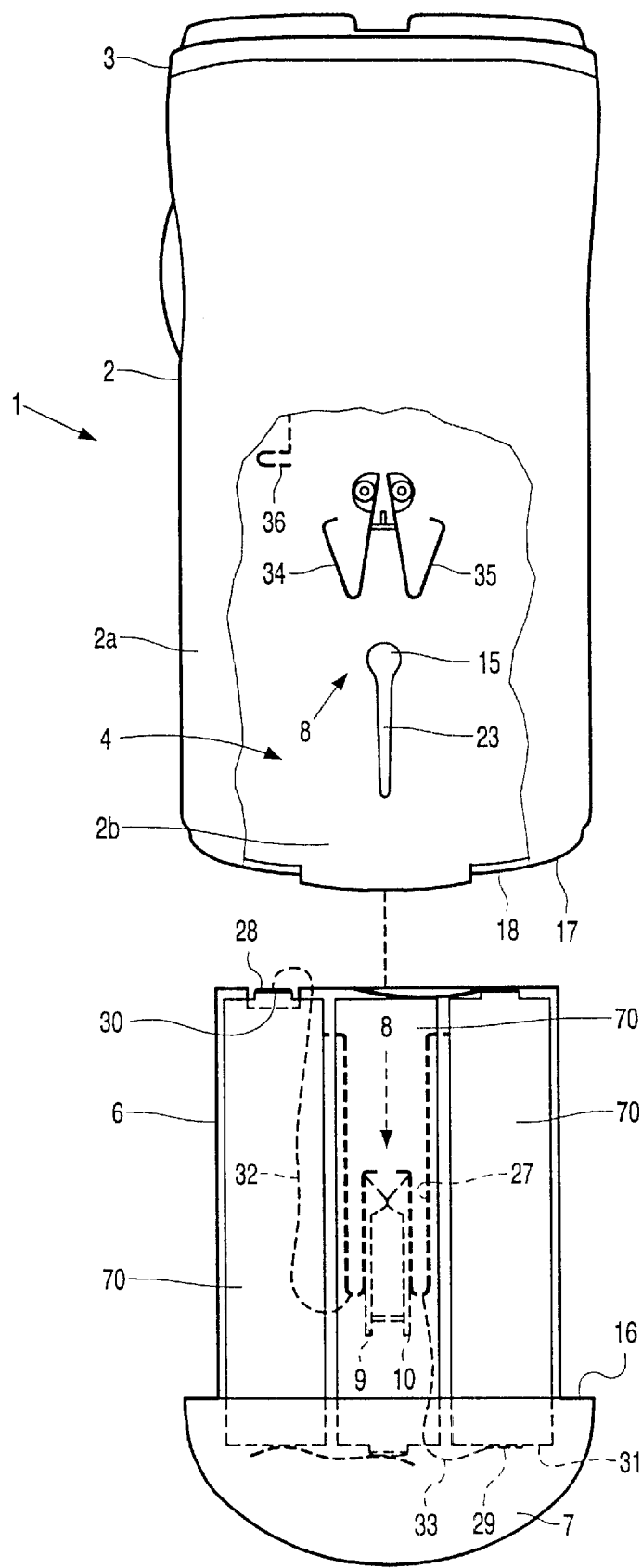
FIG. 1 is a plan view of an electric shaver, the battery holder being shown removed from the appliance.
Figure 2:
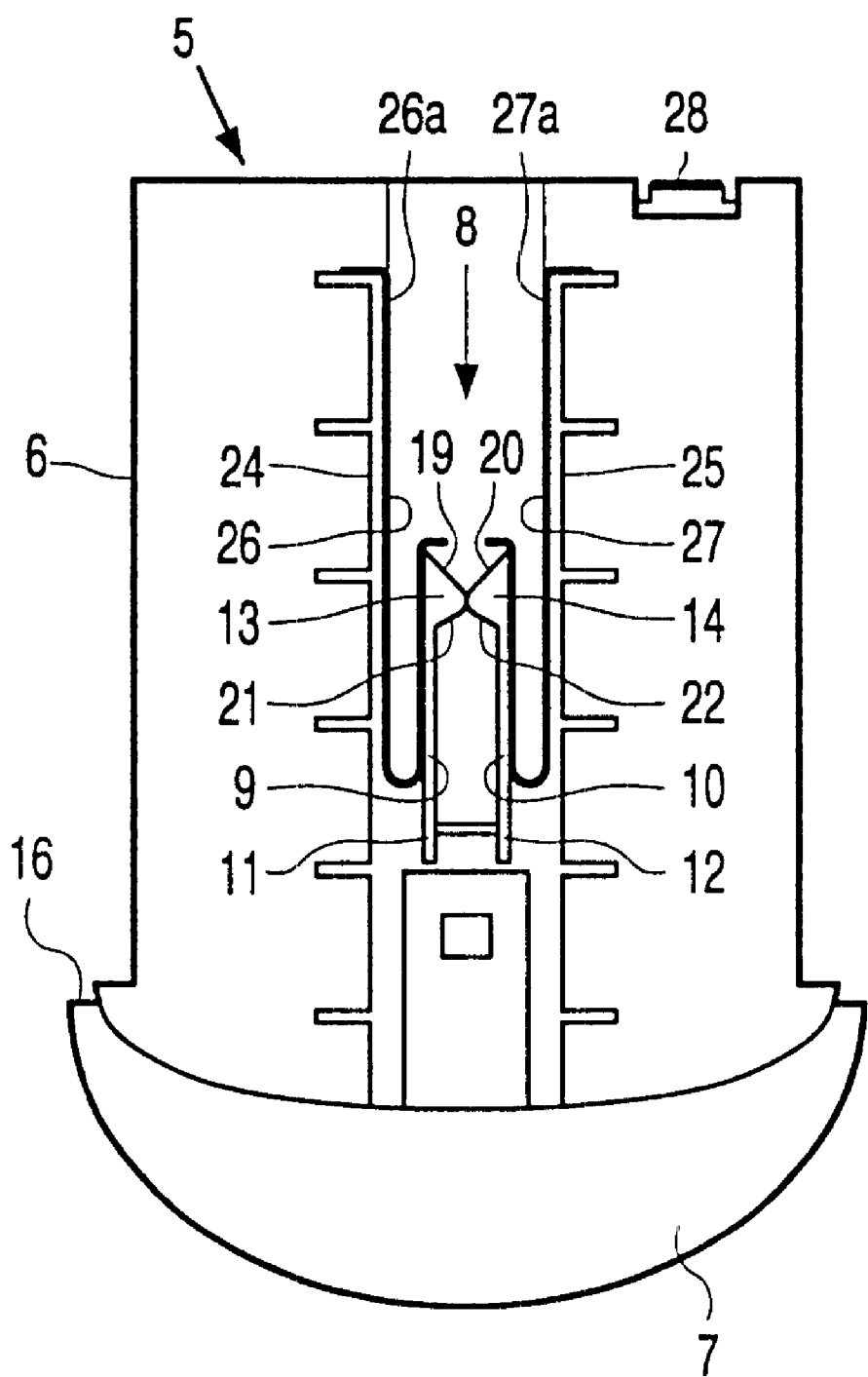
FIG. 2 shows the battery holder of FIG. 1 but now in an upside down position.

The electric shaver 1 shown in FIG. 1 has a housing 2 formed by two plastic housing sections 2a, 2b and a shaver head 3. In the lower part of the shaver the two housing sections 2a, 2b form a recess 4. The battery holder 5 has a plastic housing 6 which can accommodate, in the present case three, batteries 70. The housing 6 has an end cap 7. The housing 6 of the battery holder can be slid into the recess 4 of the shaver, the end cap 7 engaging against the end faces of the housing sections 2a, 2b. A locking mechanism 8 has been provided for locking the battery holder 5 in the shaver 1. The parts of the locking mechanism of the battery holder are situated in the lower part of the battery holder 5 shown in FIG. 1. FIG. 2 shows the lower part of the battery holder. The present locking mechanism comprises two spaced-apart resilient plastic fingers 9, 10 whose respective ends 11 and 12 are secured to the housing 6 of the battery holder 5. The free ends of the fingers, which are remote from the ends 11, 12 each carry respective projections 13 and 14. These projections project towards one another. The fingers 9, 10 can simply be molded in the injection-molding process of the housing 6. The locking mechanism further comprises a boss 15 arranged on the inner side of the housing section 2b of the shaver. This boss can also be molded simply in the injection-molding process of the housing section. When the housing 6 of the battery holder is slid into the recess 4 of the shaver the boss 15 strikes upon the projections 13, 14 and forces them apart. As sliding proceeds, the boss 15 engages behind the projections. An edge portion 16 of the end cap 7 then engages against the edge portions 17, 18 of the housing sections 2a and 2b, respectively, and is pulled against these edge portions as a result of the resilient action of the fingers 9, 10 in conjunction with the boss 15. In this way the battery holder is locked in the shaver. In order to facilitate insertion and removal of the battery holder the projections 13, 14 have been provided with inclined lead-in surfaces 19, 20 and lead-out surfaces 21, 22, respectively, the lead-in angles being smaller than the lead-out angles. This facilitates insertion of the battery holder, while removal (sliding out) of the battery holder becomes slightly more difficult. Insertion of the battery holder is further facilitated by providing the boss 15 with a guide rib fin. This guide fin changes gradually into the boss 15. When the battery holder is inserted first the guide fin 23 and then the boss 15 is slid between the projections 13 and 14 of the resilient fingers 9, 10.

The resilient closing force of the plastic fingers 9, 10 is favorably influenced with the aid of the resilient limbs whose stiffness is greater than that of the plastic fingers. For this purpose, a U-shaped metal blade spring 26 or 27 is arranged between the outer side of each finger 9, 10 and a respective wall 24 or 25 of the housing 6. The blade springs urge the fingers towards one another. The main function of the metal blade springs is to counteract the creep effect of the plastic fingers 9, 10. This results in a better defined closing force of the mechanism, i.e. the force by which the battery holder 5 is retained in the shaver 1. As the fingers are now supported by blade springs and consist of a plastic the angles of the lead-in and lead-out surfaces 19–22 of the projections 13, 14 can be realized more accurately, as a result of which the spread in the closing force of the battery holders to be manufactured is small.

The metal blade springs 26, 27 are of an electrically conductive material and are connected to electrical contact blades 28 and 29, respectively, which in their turn make contact with the respective terminals 30 and 31 of the batteries 70. The connections between the blade springs and the contact blades may be formed by simple electrical wires 32, 33. The housing section 2b of the shaver 1 has been provided with two resilient metal limbs 34, 35, which are also electrically conductive. These limbs 34, 35 are connected to an electric circuit for, inter alia, driving the motor of the shaver. However, this is not shown in any detail. When the battery holder 5 is inserted into the recess 4 of the shaver 1 the legs 26a, 27a come automatically into contact with the limbs 34 and 35, respectively. Thus, the metal blade springs 26, 27 have a dual function, i.e. supporting the plastic fingers 9, 10 of the locking mechanism 8 and the current supply from the batteries 70 to a drive unit.

In the present example the projections (13, 14) of the resilient fingers (9, 10) project towards one another. However, it is obvious that, alternatively, these projections are oriented away from one another. In that case two bosses (15) should be provided in the housing (2) of the appliance (1).

In the present example both terminals 30, 31 of the batteries are connected to the blade springs 26 and 27, respectively, via the contact blades 28 and 29, respectively. It is alternatively possible to connect only the terminal 31 to the blade spring 27 via the contact blade 29 and to ensure that, immediately after the battery holder has been inserted into the appliance, the other terminal 30 makes contact with a contact blade 36 of the appliance instead of via the metal limb 34.

In the present example the metal limbs 32, 33 in the appliance 1 are resilient, while the legs 26a, 27a of the blade springs are non-resilient. However, it is obvious that this construction may be reversed.

What is claimed is:

1. An electrical appliance having a housing and a battery holder, which battery holder has a housing which can accommodate at least one battery and which battery holder can be inserted into the housing of the electrical appliance, locking means being provided for locking the battery holder in the appliance, wherein the locking means are formed by two spaced-apart resilient plastic fingers, each of which fingers have a projection, and by at least one boss for cooperation with the projections of the fingers, which fingers are provided on the housing of the battery holder or on the housing of the appliance, and which boss is provided on the housing of the appliance when the fingers are provided on the housing of the battery holder and is provided on the housing of the battery holder when the fingers are provided on the housing of the appliance, and which fingers are supported, in the direction of their resilient action, by resilient limbs having a stiffness greater than that of the fingers.

2. An electrical appliance having a battery holder as claimed in claim 1, wherein the material of the limbs is an electrically conductive metal.

3. An electrical appliance having a battery holder as claimed in claim 2, wherein at least one of the metal limbs makes electrical contact with a terminal of the battery.

4. An electrical appliance having a battery holder as claimed in claim 1, wherein the boss has a guide in which slides between the resilient plastic fingers when the battery holder is inserted into the appliance.

5. An electrical appliance having a battery holder as claimed in claim 1 wherein the housing of the battery holder has electrically conductive limbs which, upon insertion of the battery holder into the electrical appliance, automatically make contact with the resilient metal limbs which serve for supporting the resilient plastic fingers.

6. An electrical appliance having a battery holder as claimed in claim 1 wherein a lead-in angle of the projections relative to the fingers is smaller than a lead-out angle of the projections relative to the fingers.

\* \* \* \* \*